(12) United States Patent
Martin

(10) Patent No.: US 12,308,592 B2
(45) Date of Patent: May 20, 2025

(54) ELECTRICAL GROUND ASSEMBLY WITH ELECTRICAL GROUND CONNECTION FOR A MOVEABLE MEMBER

(71) Applicant: Hubbell Incorporated, Shelton, CT (US)

(72) Inventor: Evan Martin, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 159 days.

(21) Appl. No.: 18/098,496

(22) Filed: Jan. 18, 2023

(65) Prior Publication Data

US 2023/0238759 A1    Jul. 27, 2023

Related U.S. Application Data

(60) Provisional application No. 63/303,405, filed on Jan. 26, 2022.

(51) Int. Cl.
| | |
|---|---|
| *H01R 41/00* | (2006.01) |
| *E06B 11/02* | (2006.01) |
| *H02G 3/30* | (2006.01) |

(52) U.S. Cl.
CPC ............ *H01R 41/00* (2013.01); *E06B 11/026* (2013.01); *H02G 3/30* (2013.01)

(58) Field of Classification Search
CPC ...... E06B 11/026; E06B 11/045; E06B 11/02; E06B 11/04; H01R 41/00; H02G 3/30
USPC ........................................................ 174/5 SG
See application file for complete search history.

(56) References Cited

U.S. PATENT DOCUMENTS

| | | | |
|---|---|---|---|
| 6,419,504 B1 | 7/2002 | Nelson | |
| 6,507,160 B2* | 1/2003 | Wood | E05F 15/60 318/135 |
| 7,883,338 B2* | 2/2011 | Smith | H01R 13/648 439/33 |
| 9,587,432 B1* | 3/2017 | Valdez | E05F 17/004 |
| 11,805,757 B1* | 11/2023 | Klein | A01K 3/005 |

(Continued)

OTHER PUBLICATIONS

International Search Report dated May 1, 2023, which issued in the corresponding PCT Application No. PCT/US2023/11507.

*Primary Examiner* — Timothy J Thompson
*Assistant Examiner* — Michael F McAllister
(74) *Attorney, Agent, or Firm* — Dickinson Wright PLLC

(57) ABSTRACT

A ground assembly for movable member includes an electrical ground connection that does not interfere with movement and operation of the movable member. The movable member can be a sliding member (e.g., sliding barrier, gate or closure member). The ground assembly includes an electrical connector fixed to the movable member and moves along a length of a fixed grounding member while maintaining contact with the electrical grounding member to provide continuous grounding connection during movement of the movable member. The fixed electrical grounding member can be oriented with a longitudinal length parallel to direction of movement of the movable member where the electrical connector of the movable member moves along the electrical grounding member. Alternatively, the electrical connector is fixed to the grounding member and the movable member includes a surface that slides in contact with the electrical connector by movement of the movable member relative to the grounding member.

17 Claims, 4 Drawing Sheets

(56) References Cited

U.S. PATENT DOCUMENTS

| | | |
|---|---|---|
| 2008/0112658 A1 | 5/2008 | Justin |
| 2020/0106196 A1 | 4/2020 | Oostdyk et al. |
| 2021/0062578 A1* | 3/2021 | Moore .................. H02G 3/263 |

* cited by examiner

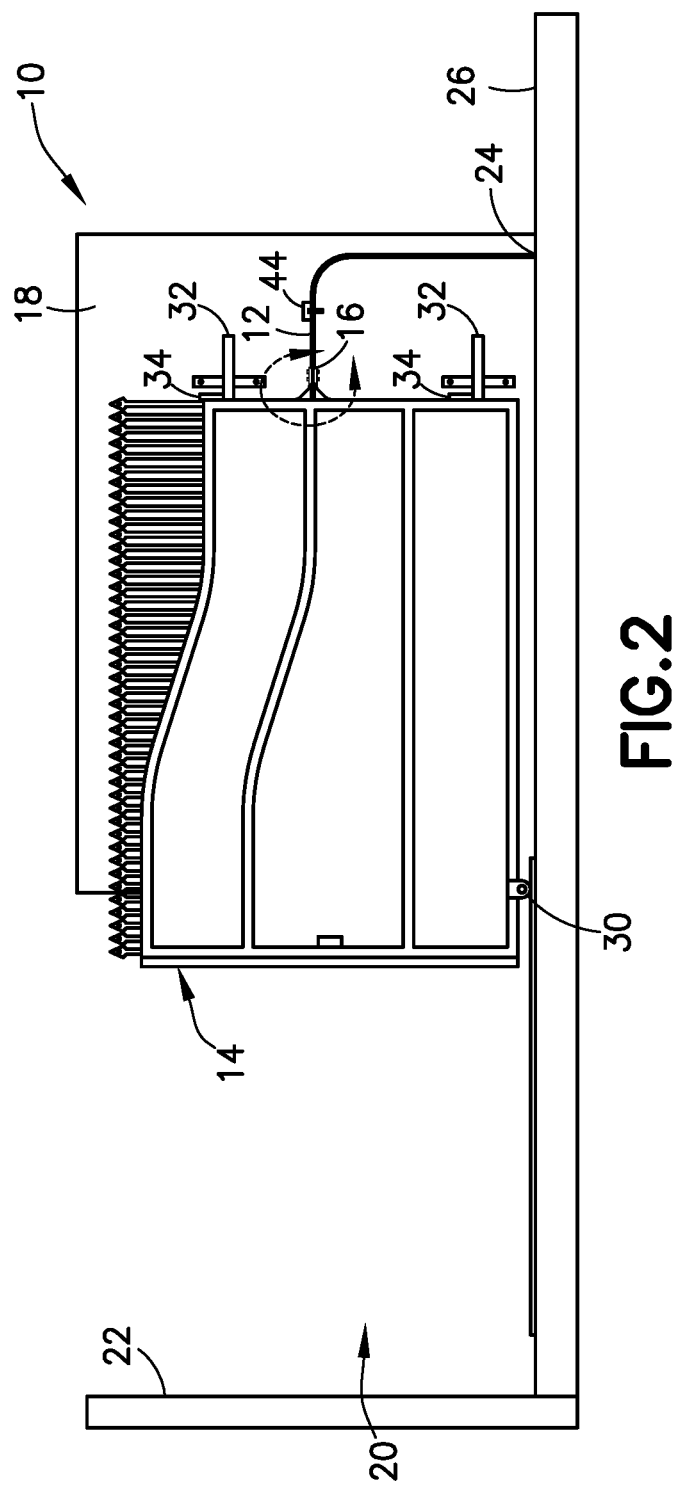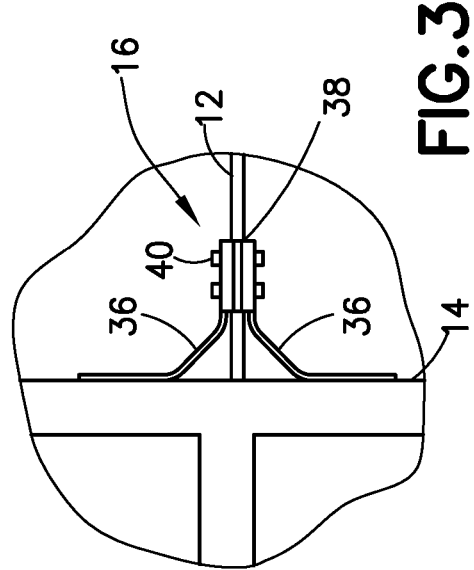

ELECTRICAL GROUND ASSEMBLY WITH ELECTRICAL GROUND CONNECTION FOR A MOVEABLE MEMBER

This application claims priority to U.S. Provisional Patent Application No. 63/303,405, filed on Jan. 26, 2022, which is hereby incorporated by reference in its entirety.

FIELD OF THE INVENTION

The present invention relates to a grounding assembly to provide a ground connection for a movable object. The invention is further directed to a grounding assembly to provide an electrical ground connection for a sliding member, such as a closure, sliding barrier, gate or fence.

BACKGROUND OF THE INVENTION

Gates and fences are commonly used to surround areas to be protected. In certain installations, such as substation installations and electrical generating stations, the gate and fence are required to be electrically grounded to protect the personnel and the structures from electrical shock. The grounding mechanism for the gate must be configured so that the gate can open and close freely without interference from the grounding mechanism.

Various grounding mechanisms are known for providing a grounding connection for a gate that is connected to a fence structure. One mechanism includes a flexible cable having one end connected to a grounding rod or other grounded metal structure. An opposite end of the flexible cable is connected to the gate where the cable has a length to allow the gate to open and close. A tensioning or support mechanism is often provided to hold the flexible cable off the ground and in a position that the flexible cable does not interfere with the operation of the gate. The support mechanism can be by suspending the grounding end of the cable above the ground and/or the gate.

In other mechanisms, a grounding cable is suspended by a trolley mechanism that slides or rolls with the movement of the gate to support the cable. The trolley mechanism can interfere with the movement of the gate and increase the cost and number of moving parts to operate as intended.

While the above describe mechanisms have been suitable for the intended purpose, there is a continuing need in the industry for improved mechanisms for providing electrical grounding of a gate.

SUMMARY

The grounding assembly of the present disclosure relates to a device for proving an electrical ground connection for a movable member. The movable member in the embodiments described include a closure, a gate, such as for a fence, a door, a barrier or other movable electrically conducting member that requires grounding during use and movement.

The grounding assembly is suitable for use in power substations or other electrical generating facilities. In such facilities, it is important to properly ground metal structures to prevent or reduce the risk of electrical shock. The grounding assembly as described provides an effective assembly for providing an electrical ground connection for a movable object.

The grounding assembly is particularly suitable for use with a movable member, such as a closure, sliding gate or rolling gate that moves in a direction between an open position and a closed position. The grounding assembly in one embodiment includes a movable member that is configured for and mounted for linear movement. The grounding assembly as described herein includes a minimum number of parts and moving parts that can wear or become tangled with the cables of the prior devices.

The grounding assembly can be configured for use with a movable member, such as a gate, that moves in a linear direction and maintains an electrical connection between the movable member and a grounding member. In one embodiment, the grounding member is fixed relative to the movable member. In another embodiment, the movable member has an electrical connector fixed to the movable member that moves relative to the grounding member that is in a fixed position during movement of the movable member.

The grounding member can be oriented with a longitudinal dimension extending parallel to the linear direction of movement of the movable member. The electrical connector can be fixed to the movable member and movable relative to the grounding member. In one embodiment, the electrical connector slides on a surface of the grounding member to maintain the electrical contact between the movable member and the grounding member throughout the range of movement of the movable member.

In another embodiment, the movable member can include an elongated electrically conducting member that moves relative to an electrical connector that is grounded. The elongated electrically conducting member can be an electrical cable or a rigid electrically conducting rod or pole.

The features of the assembly are attained by providing an electrical grounding member and a movable member. The movable member is configured for moving in a linear path and has an electrical connector contacting the grounding member to form an electrical connection between the grounding member and the electrical connector during movement of the movable closure member relative to the grounding member.

The features of the assembly are also provided by a closure member mounted for linear movement between an open position and a closed position, a grounding member is oriented in a fixed position with respect to the closure member, and an electrical connector. The electrical connector has a first end electrically connected to the closure and a second end electrically connected to the grounding member during movement of the closure between the open position and closed position These and other features of the device will become apparent from the following detailed description, which in conjunction with the drawings disclose various embodiments of the device.

BRIEF DESCRIPTION OF THE DRAWINGS

The various aspects and advantages of embodiments of the device will be more readily appreciated from the following detailed description, taken in conjunction with the accompanying drawings, of which:

FIG. 2 is an elevational view of the electrical grounding assembly of FIG. 1 showing the movable member in an open position;

FIG. 3 is an elevational view of the electrical connector;

DETAILED DESCRIPTION OF EMBODIMENTS

Figure 1:
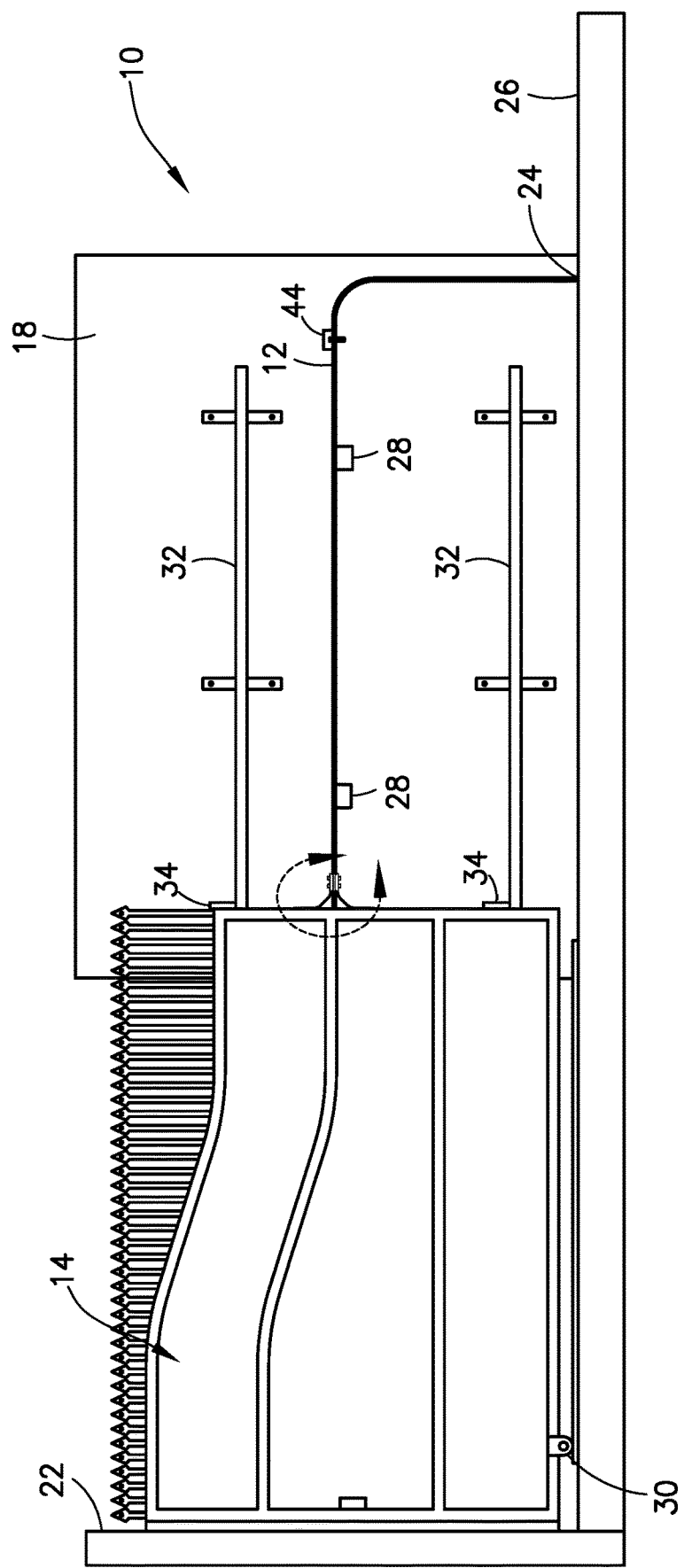
FIG. 1 is an elevational view of an electrical grounding assembly in one embodiment showing the movable member in a closed position.

Reference will now be made in detail to embodiments of the present device, which are illustrated in the accompanying drawings, wherein like reference numerals refer to like elements throughout. The embodiments described herein exemplify, but do not limit, the present device by referring to the drawings.

It will be understood by one skilled in the art that this disclosure is not limited in its application to the details of construction and the arrangement of components set forth in the following description or illustrated in the drawings. The embodiments herein are capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting. Any of the embodiments and/or elements and features disclosed herein may be combined with one another to form various additional embodiments not specifically disclosed, as long as they do not contradict or are not inconsistent with each other. Terms of degree, such as "substantially", "about" and "approximately" are understood by those skilled in the art to refer to reasonable ranges around and including the given value and ranges outside the given value, for example, general tolerances associated with manufacturing, assembly, and use of the embodiments. The term "substantially" when referring to a structure or characteristic includes the characteristic that is mostly or entirely present.

FIG. 1 is an elevational view of an exemplary embodiment of the electrical grounding assembly 10. The grounding assembly 10 includes a grounding member 12, a movable member such as a closure member 14, and an electrical connector 16. The moveable member can be any member or structure that can be moved between a first position and a second position. In the embodiments show, the movable member is configured to move in a linear direction. In the following, the movable member is referred to as the closure member or gate, although the movable member is not limited to a closure member or gate. The terms closure member, gate and movable member can be used interchangeably in the description of the assembly.

In the embodiment shown, the movable member is a closure member that is configured to move between an open position and a closed position. In the embodiments described, the closure member is configured to move in a linear path between an open position and a closed position. As shown, the movable member is a closure member 14 for a barrier, such as a wall 18 or fence having an access opening 20 where the closure member 14 is movable in a linear path relative to the wall 18. The wall 18 can be any suitable barrier such as a standard fence having a plurality of poles 22 or upright members for supporting a barrier material.

In the embodiment of FIGS. 1 and 2, the electrical grounding member 12 is supported by a suitable support. In the embodiment shown, the wall 18 forms a support structure for the electrical grounding member 12 and the closure member 14. The wall 18 supports the grounding member 12. As shown, the grounding member 12 is connected to an electrical ground 24, such as a ground anchor or other electrically conducting member to provide an electrical ground for the grounding member 12. The electrical ground 24 can be a separate member electrically connected to the grounding member 12 by a coupling 44 or integrally formed with the grounding member 12. As shown in FIGS. 1 and 2, the grounding member 12 has a longitudinal dimension and is oriented with the longitudinal dimension extending substantially parallel to the path of movement of the closure member 14. In the embodiment shown, the grounding member 12 is oriented substantially parallel to the surface of the ground 26. The grounding member 12 is attached to the wall 18 by a suitable attachment mechanism such as brackets 28.

The grounding member 12 in the embodiment of FIGS. 1 and 2 is an electrically conducting wire, cable, tube or rod extending between the brackets 28. The cable can be a flexible cable or a rigid cable. An example of suitable cable is a CCS cable. The cable forming the grounding member 12 can be pulled tight between the brackets 28 to limit sagging. In other embodiments, the grounding member 12 can be rigid rod or pole. The grounding member 12 can be made of a suitable electrically conducting material that is able to provide the grounding connection. The grounding member 12 can be a metal, such as copper, aluminum, steel or copper clad steel.

The movable member shown as a closure member 14 is configured for moving between a first position and a second position relative to the wall, fence or other barrier. In the embodiment shown, the closure member 14 is a gate having structure for moving in a linear direction between an open position and a closed position. The closure member 14 can be made of a suitable material having an electrically conducting portion made of steel, aluminum or other electrically conducting material. The closure member can be made entirely of metal or other electrically conducting material. In the embodiment shown, the closure member 14 is a metal closure member or gate or a closure member gate having electrically conducting parts or components that need to be grounded for safety considerations. The closure member 14 includes suitable hardware for moving the closure member 14 between the first position and the second position. The closure member 14 as shown includes one or more rollers 30 for supporting the closure member 14 and assisting in the linear movement. The wall 18, in the embodiment shown, includes rails 32 mounted for supporting and guiding the movable closure member 14. Guide rollers 34 are provided on the movable member 14 that are operatively connected to the rails 32 to guide the movable member 14 in the linear path.

The electrical connector 16 shown in FIG. 2 is electrically coupled to the movable member 14. In the embodiment shown, the electrical connector 16 is coupled directly to the movable closure member 14 or to a metal electrically conducting component of the movable closure member 14. Referring to FIG. 3, the electrical connector 16 is configured to electrically connect to the grounding member 12 where the electrical connector 16 can provide an electrical connection with the grounding member 12 through a range of movement of the closure member 14.

The electrical connector 16 as shown includes at least one arm 36 having a first end connected to the movable member 14 by welding or by a suitable fastener, such as a bolt, and a second end connected to an electrical contact 38. In the embodiment shown, the electrical connector 16 has two arms 36, each with an electrical contact 38, configured to provide an electrical connection between the grounding member 12 and the closure member 14. The electrical contact 38 is an electrically conducting member, such as a bushing, that is able to provide continuous electrical contact with the grounding member 12 during the full range of movement of the closure member 14 and movement between the electrical connector 16 and the grounding member 12. The electrical contact 38 can be coupled to a respective arm 36 by suitable fasteners, such as bolts 40. The electrical contact 38 can be a graphite contact, graphite bushing, or other suitable electrically conducting material that is able move along the length of the grounding member 12. The electrical contact 38 in the embodiment shown is in direct contact with the surface of the grounding member to slide on a surface of the grounding member and along the length of the grounding member while maintaining the electrical connection between the electrical connector 16 and the grounding member 12. As shown in FIG. 3, the arms 36 and the respective electrical contact 38 are oriented on opposite sides of the grounding member 12 to maintain electrical contact on opposite sides of the grounding member 12.

The arms 36 can be spring members to bias the electrical contacts 38 toward the grounding member 12 to promote continuous contact during movement of the closure member 14 with respect to the grounding member 12. The arms 36 are mounted to provide a biasing force of the electrical contacts 38 against the opposite side surfaces of the grounding member 12. In the embodiment shown, the first end of the arm 36 is connected to the structure, frame or pole of the movable member and the second end supporting the electrical contact 38 is oriented parallel to the longitudinal dimension of the grounding member 12. The biasing of the electrical contact 36 can be by other suitable mechanisms, such as the spring arm 36 or by a coil spring.

As shown in FIGS. 1 and 2, the closure member 14 is mounted with respect to the wall 18 or other support member for movement in a linear direction where the electrical contacts 38 are in electrical contact with the grounding member 12. The grounding member 12 in cooperation with the electrical connector 16 provides a grounding connection for the movable member 14 to reduce the potential of electrical shock to an operator touching the movable member 14. The movable member 14 can be moved to the open position shown in FIG. 2 where the electrical connector 18 slides on the surface of the grounding member 12 to maintain a continuous electrical grounding connection with the grounding member 12.

Figure 4:
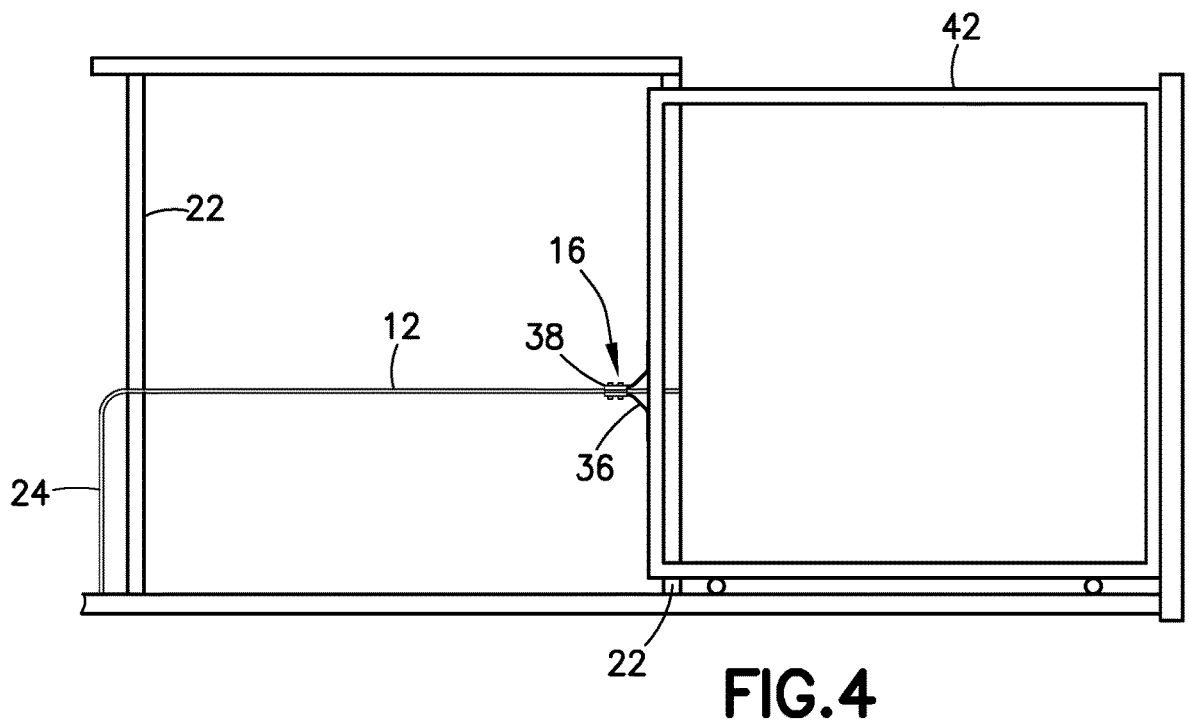
FIG. 4 is an elevated view of the assembly in another embodiment.
Figure 5:
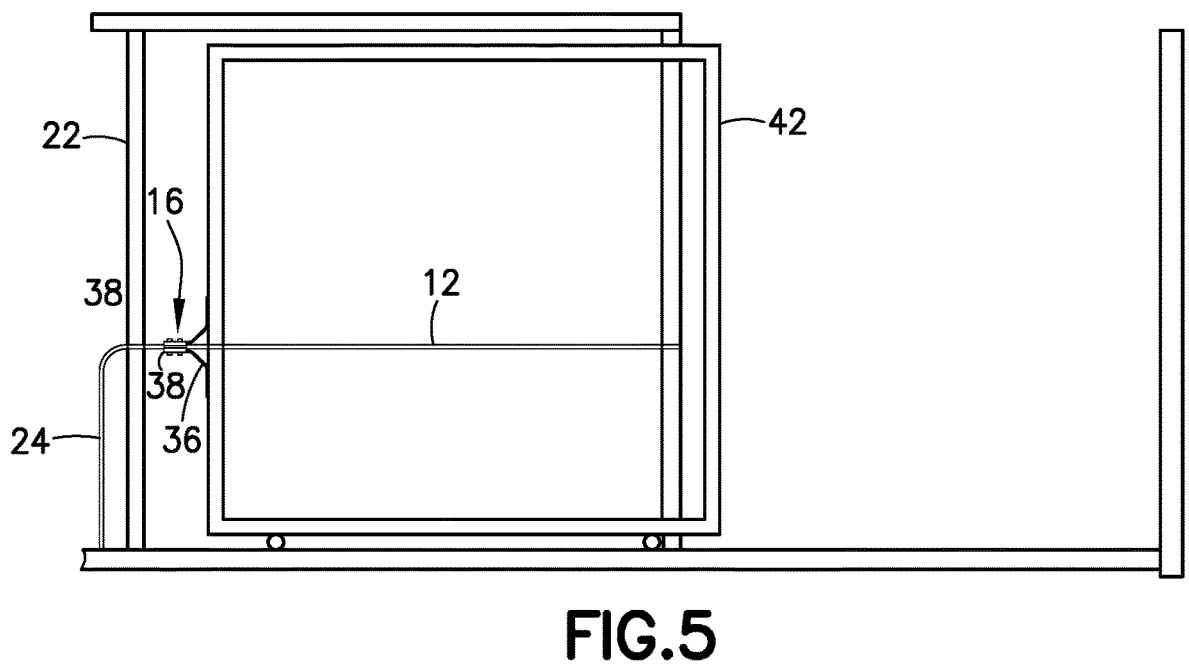
FIG. 5 is an elevated view of the assembly of FIG. 4 in the open position.

FIGS. 4 and 5 show another embodiment where the closure member is a fence gate 42. The assembly is similar to the embodiment of FIGS. 1-3 so that similar components are indicated by the same reference number. In this embodiment, the grounding member 12 is a rigid metal rod or pipe connected directly to a support shown as poles 22 and oriented parallel to the direction of movement of the gate 42. The gate 42 is configured to move in a linear path between a first open position and a second closed position in a manner similar to the embodiment of FIGS. 1-3.

Figure 6:
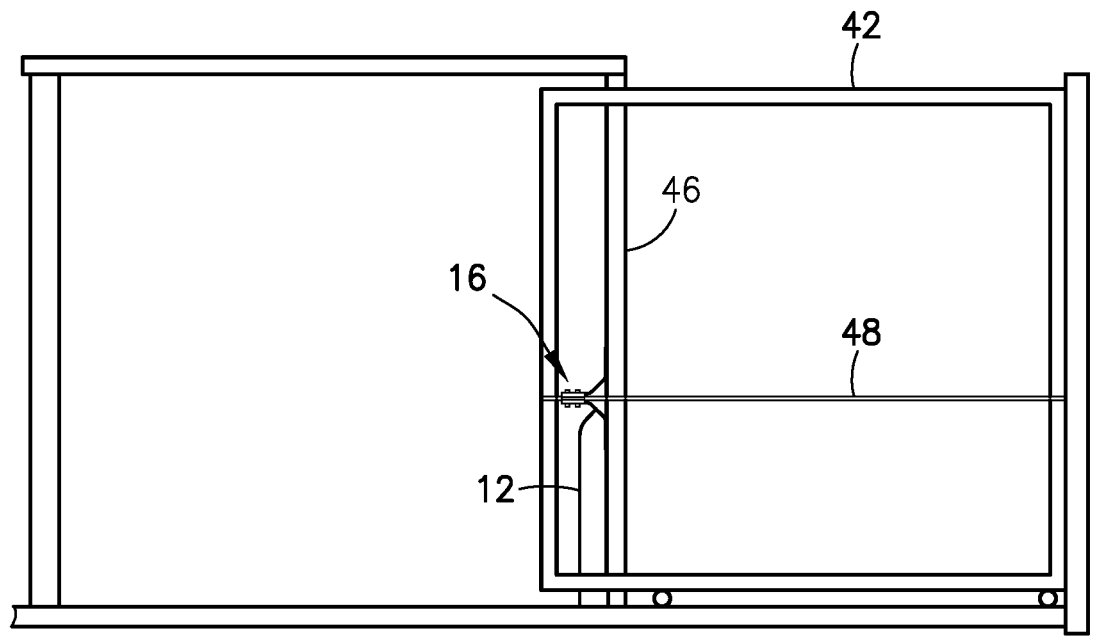
FIG. 6 is an elevational view of the assembly in a further embodiment.
Figure 7:
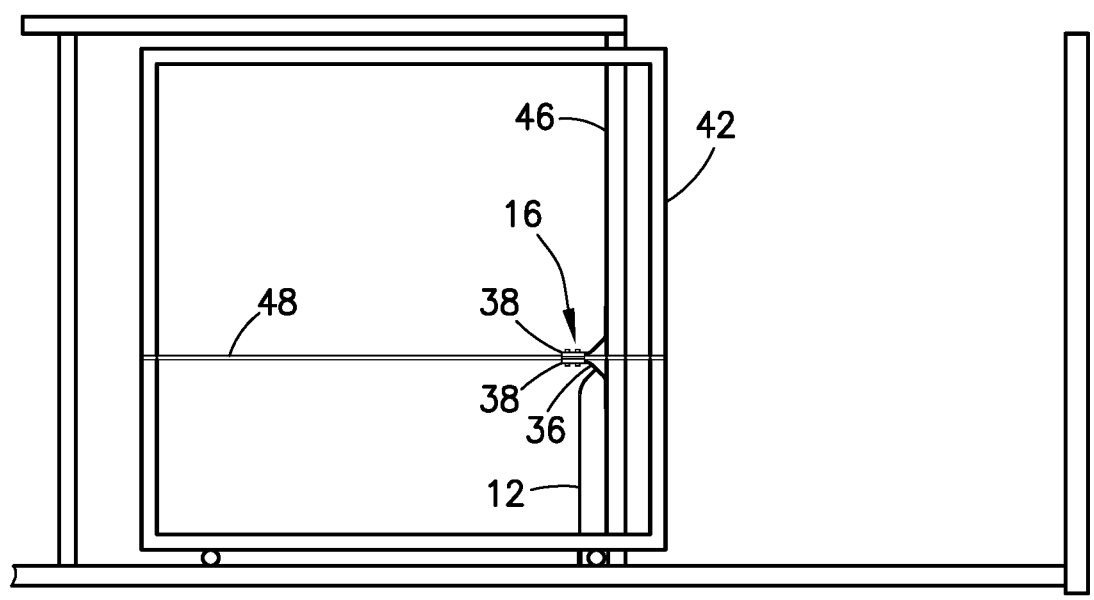
FIG. 7 is an elevational view of the assembly of FIG. 6 in an open position.

FIGS. 6 and 7 show an alternative embodiment that is similar to the previous embodiments so that like members are indicated by the same reference numbers. In this embodiment, an electrically conducting member 48 is coupled to the movable member shown as a gate 42 and forming an electrical grounding connection between the electrically conducting member 48 and the gate 42. In the embodiment shown, the electrically conducting member 48 extends longitudinally relative to the direction of movement of the gate. The electrically conducting member can be a cable that can be flexible or a rigid member such as a rigid rod or pipe. The electrically conducing member 48 in the embodiment shown extends between the longitudinal ends of the gate 42.

In other embodiments, the electrically conducting member 48 has a length corresponding to a length of travel of the gate 42. The gate 42 is mounted for movement with respect to a support structure 46, such as a fence or wall. The electrical connector 16 is connected directly to a section of the support structure 46 and the electrical connector 16 is oriented to make the electrical connection with the grounding member 12 or to the support structure 46 during linear movement of the gate 42 relative to the support structure 46. The electrical connector 16 is grounded to provide a grounding connection for the gate 42. In the embodiment shown, the electrical connector 16 can be connected directly to the grounding member 12, such as a ground anchor. In other embodiments, the support structure 46 can be a metal structure that is grounded or connected to a ground anchor so that the electrical connector 16 is connected to ground through the support structure 46.

As shown in FIGS. 6 and 7, the gate 42 can move between a first position and a second position, such as between an open position and a closed position relative the support structure 46. In this embodiment, the electrical connector 16 is in a fixed position by being coupled to the support structure 46. The electrically conducting member 48 is movable by being coupled to the gate 42 for movement with the gate relative to the electrical connector 16. The electrical connector 16 and the contacts 38 are in a fixed position relative to the gate 42 and the electrically conducing member 48. As shown, the contacts 38 of the electrical connector 16 contact opposite surfaces of the electrically conducting member 48 and slide on the surface of the electrically conducting member 48 to maintain a continuous electrical connection between the gate 42 and the electrically conducting member 48 to provide a ground connection between the gate 42 and the grounding member 12.

Although only a few embodiments of the present device are shown and described, the present device is not limited to the described embodiments. Instead, it will be appreciated by those skilled in the art that changes may be made to these embodiments without departing from the principles and spirit of the device. Different embodiments can be combined with other embodiments as long as they are not inconsistent with each other. It is particularly noted that those skilled in the art can readily combine the various technical aspects of the various elements of the various exemplary embodiments that have been described above in numerous other ways, all of which are considered to be within the scope of the disclosure and equivalents thereof.

The invention claimed is:

1. An electrical grounding assembly comprising:
   an electrically grounded grounding member; and
   a movable member configured for moving in a path with respect to said grounding member; and
   an electrical connector electrically connected to said movable member and contacting said grounding member to form an electrical connection between said grounding member and said electrical connector during movement of said movable member relative to said grounding member;

wherein said grounding member is in a fixed position relative to said movable member and said electrical connector is fixed to said movable member and contacts said grounding member during movement of said movable member between said first position and said second position; and wherein said grounding member has a longitudinal length extending in a direction parallel to a direction of movement of said movable member.

2. The electrical ground assembly according to claim 1, wherein said electrical connector comprises an electrical contact for contacting said grounding member during movement of said movable member.

3. The electrical grounding assembly according to claim 2, wherein said grounding member is a rigid member extending a length at least equal to a distance of travel of the movable member and where said electrical contact slides on a surface of said grounding member.

4. The electrical grounding assembly according to claim 2, wherein said electrical connector includes a spring to bias said electrical contact into contact with said grounding member.

5. The electrical grounding assembly according to claim 1, wherein said electrical connector includes a first electrical contact and a second electrical contact, and where said grounding member is captured between said first electrical contact and said second electrical contact.

6. The electrical grounding assembly according to claim 5, wherein said first electrical contact and said second electrical contact are biased toward opposite sides of said grounding member.

7. The electrical grounding assembly according to claim 1, wherein said electrical contact is a graphite bushing contacting said grounding member.

8. The grounding assembly of claim 1, wherein said movable member is a gate that moves in a linear direction relative to a support structure, and where said gate moves in a linear path with respect to said support structure.

9. A grounding assembly comprising:
a closure member mounted for movement between an open position and a closed position;
a grounding member oriented in a fixed position with respect to said closure member; and
an electrical connector having a first end electrically connected to said closure member and a second end electrically connected to said grounding member during movement of said closure member between said open position and closed position;
wherein said closure member is a gate configured for linear movement and said grounding member has longitudinal dimension extending in a direction parallel to a direction of movement of said gate; and
wherein said grounding member is a rigid member extending parallel to the direction of movement of said gate.

10. The grounding assembly according to claim 9 wherein said electrical connector has a first end fixed to said gate and a second end in contact with said grounding member for sliding on a surface of said grounding member.

11. The grounding assembly device of claim 10, wherein said electrical connector is biased toward said grounding member to provide continuous electrical contact with said grounding member.

12. The grounding assembly of claim 10, wherein said electrical connector includes a first electrical contact for contacting a first side of said grounding member and a second electrical contact for contacting a second side of said grounding member.

13. A grounding assembly comprising:
a closure member mounted for movement between an open position and a closed position;
a grounding member oriented in a fixed position with respect to said closure member; and
an electrical connector having a first end electrically connected to said closure member and a second end electrically connected to said grounding member during movement of said closure member between said open position and closed position;
wherein said electrical connector is electrically coupled to said grounding member and where said closure member moves in a linear direction relative to said grounding member and electrical connector; and
wherein said closure member includes an elongated member fixed to said closure member and configured for contacting said electrical connector, and where said electrical connector is in a fixed position and connected to said grounding member where said elongated member slides relative to said electrical connector.

14. The grounding assembly of claim 13, wherein said electrical connector includes a first electrical contact contacting a first side of said elongated member and a second electrical contact contacting a second side of said elongated member.

15. The grounding assembly of claim 9, wherein said grounding member is an electrically conducting cable, rod or pipe.

16. A grounding assembly comprising:
a movable member configured to move between a first position and a second position;
an electrically grounded grounding member, and
an electrical connector electrically coupled to one of said movable member or said grounding member, and where said electrical connector moves on a surface of one of said movable member or said grounding member when said movable member moves between said first position and said second position;
wherein said electrical connector is fixed to said movable member, and said electrical connector slides on a surface of said grounding member when said movable member move between said first position and said second position; and
wherein said grounding member is in a fixed position relative to said movable member and has a longitudinal dimension extending in a longitudinal direction of travel of said movable member.

17. The grounding member of claim 16, wherein said electrical connector is in a fixed position relative to said grounding member, and where said grounding member is fixed to said movable member where said grounding member slides on a surface of said electrical connector when said movable member moves between said first position and said second position.

* * * * *